US011292062B2

(12) United States Patent
Snis

(10) Patent No.: US 11,292,062 B2
(45) Date of Patent: Apr. 5, 2022

(54) METHOD AND DEVICE FOR PRODUCING THREE-DIMENSIONAL OBJECTS

(71) Applicant: Arcam AB, Moelndal (SE)

(72) Inventor: Anders Snis, Uddevalla (SE)

(73) Assignee: Arcam AB, Moelndal (SE)

(*) Notice: Subject to any disclaimer, the term of this patent is extended or adjusted under 35 U.S.C. 154(b) by 511 days.

(21) Appl. No.: 15/967,155

(22) Filed: Apr. 30, 2018

(65) Prior Publication Data

US 2018/0345374 A1    Dec. 6, 2018

Related U.S. Application Data

(60) Provisional application No. 62/512,492, filed on May 30, 2017.

(51) Int. Cl.
*B22F 12/00* (2021.01)
*B33Y 10/00* (2015.01)
(Continued)

(52) U.S. Cl.
CPC ............ *B22F 12/00* (2021.01); *B22F 3/1017* (2013.01); *B23K 15/002* (2013.01);
(Continued)

(58) Field of Classification Search
CPC ................ B22F 3/1055; B22F 3/1017; B22F 2003/1056; B22F 2003/1057;
(Continued)

(56) References Cited

U.S. PATENT DOCUMENTS 2,264,968 A    12/1941   De Forest
2,323,715 A     7/1943   Kuehni
(Continued)

FOREIGN PATENT DOCUMENTS

CA         2860188 A1    6/2006
CN       101607311 A   12/2009
(Continued)

OTHER PUBLICATIONS

International Search Report and Written Opinion dated Aug. 31, 2018 for PCT/EP2018/063072 (15 pages).
(Continued)

*Primary Examiner* — Tu B Hoang
*Assistant Examiner* — Yeong Juen Thong
(74) *Attorney, Agent, or Firm* — Dinsmore & Shohl LLP

(57) ABSTRACT

A method for producing three-dimensional objects layer by layer using a powdery material which can be solidified by irradiating it with at least two electron beams, said method comprises a pre-heating step, wherein the pre-heating step comprises the sub-step of scanning a pre-heating powder layer area (100) by scanning a first electron beam in a first region (I) and by scanning a second electron beam in a second region (II) distributed over the pre-heating powder layer area (100), wherein consecutively scanned paths are separated by, at least, a security distance (ΔY), said sub-step further comprising the step of synchronising the preheating of said first and second electron beams when simultaneously preheating said powder material within said first and second regions respectively, so that said first and second electron beams are always separated to each other with at least a minimum security distance (ΔX).

12 Claims, 7 Drawing Sheets

(51) Int. Cl.

| | | |
|---|---|---|
| *B33Y 30/00* | (2015.01) | |
| *B33Y 50/02* | (2015.01) | |
| *B23K 15/00* | (2006.01) | |
| *B29C 64/268* | (2017.01) | |
| *B23K 15/06* | (2006.01) | |
| *B29C 64/277* | (2017.01) | |
| *B23K 26/082* | (2014.01) | |
| *B22F 3/10* | (2006.01) | |
| *B23K 26/08* | (2014.01) | |
| *C22C 1/04* | (2006.01) | |
| *B22F 10/10* | (2021.01) | |

(52) U.S. Cl.
CPC ........ *B23K 15/004* (2013.01); *B23K 15/0086* (2013.01); *B23K 15/0093* (2013.01); *B23K 15/06* (2013.01); *B23K 26/082* (2015.10); *B23K 26/0892* (2013.01); *B29C 64/268* (2017.08); *B29C 64/277* (2017.08); *B33Y 10/00* (2014.12); *B33Y 30/00* (2014.12); *B33Y 50/02* (2014.12); *B22F 10/10* (2021.01); *B22F 2203/11* (2013.01); *B22F 2999/00* (2013.01); *C22C 1/0416* (2013.01); *C22C 1/0458* (2013.01)

(58) Field of Classification Search
CPC .. B22F 2203/11; B22F 2999/00; B33Y 10/00; B33Y 30/00; B33Y 50/00; B33Y 50/02; B29C 64/277; B29C 64/268; B23K 15/002; B23K 15/004; B23K 26/0892; C22C 1/0416; C22C 1/0458
USPC ............ 219/121.17, 121.16, 121.12, 121.83; 264/485; 425/174.4, 385, 112, 375
See application file for complete search history.

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,138,807 B1* | 9/2015 | Takezawa ............ B22F 3/1055 |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,636,770 B2 | 5/2017 | Schwarze et al. |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Penning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |

(56) References Cited

U.S. PATENT DOCUMENTS

| | | |
|---|---|---|
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1* | 1/2010 | Larsson .............. B22F 10/20 264/485 |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0079003 A1 | 3/2018 | Lin et al. |
| 2018/0154444 A1 | 6/2018 | Jonasson |
| 2019/0315063 A1* | 10/2019 | Von Burg ............. B29C 64/268 |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| CN | 104812518 A | 7/2015 |
| CN | 105873698 B | 1/2020 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| JP | 2015193883 A | 11/2015 |
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |

(56) References Cited

FOREIGN PATENT DOCUMENTS

| WO | WO 2001/081031 A1 | 11/2001 |
|----|----|----|
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

International Preliminary Report on Patentability dated Sep. 11, 2019 for PCT/EP2018/063072 (17 pages).
Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
Gibson, D.W., et al., "Additive Manufacturing Technologies: Rapid Prototyping to Direct Digital Manufacturing", 2010, pp. 126-129, Springer, New York.
Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.
Klassen, Alexander, et al., "Modelling of Electron Beam Absorption in Complex Geometries", *Journal of Physics D: Applied Physics*, Jan. 15, 2014, 12 pages, vol. 47, No. 6, Institute of Physics Publishing Ltd., Great Britain.
Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.
Weigel, T.H., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
Chinese Patent Application No. 201880036157.6 Office Action, dated May 6, 2021 (28 pages with English Translation).
Chinese Patent Application No. 201880036157.6 Office Action, Nov. 17, 2021 (8 pages with English Translation).

\* cited by examiner

METHOD AND DEVICE FOR PRODUCING THREE-DIMENSIONAL OBJECTS

CROSS-REFERENCE TO RELATED APPLICATIONS

This application claims priority to and the benefit of U.S. Provisional Patent Application Ser. No. 62/512,492, filed May 30, 2017, the contents of which as are hereby incorporated by reference in their entirety.

BACKGROUND

Related Field

This invention relates to a method and device for producing three-dimensional objects layer by layer using a powdery material which can be solidified by irradiating it with a high-energy beam. In particular, the invention relates to a powder pre-heating process using at least two electron beams.

Description of Related Art

Equipment for producing a three-dimensional object layer by layer using a powdery material which can be solidified, or fused together, by irradiating it with a high-energy beam of electromagnetic radiation or electrons are known from e.g. U.S. Pat. Nos. 4,863,538, 5,647,931 and SE524467. Such equipment include for instance a supply of powder, means for applying a layer of powder on a vertically adjustable platform or working area, and means for directing the beam over the working area. The powder sinters or melts and solidifies as the beam moves over the working area.

When melting or sintering a powder using a high-energy beam, it is important to avoid exceeding the vaporization temperature of the powder, since otherwise the powder will merely vaporize instead of forming the intended product. US2005/0186538 discloses a method focusing on this problem. In this method a laser beam repeatedly is directed to the same powder target area during the melting/sintering phase as to stepwise raise the powder temperature. This way, a too high powder temperature is avoided.

When using an electron beam instead of a laser beam, the situation is in some ways different. As the electron beam hits the powder, a charge distribution develops around the electron target area. If the charge distribution density exceeds a critical limit, an electrical discharge will occur since the powder particles will repel each other. A result of such a discharge is that the structure of the powder layer will be destroyed. Applying the method according to US2005/0186538 to a powder melting/sintering device equipped with an electron beam is likely to give a poor result since no measures are taken in that method to avoid such discharges.

In WO 2008/013483 it is disclosed a method for avoiding such discharges by separating consecutive scan lines by a security distance. However, as the build area increases multiple electron beams from multiple electron beam sources must be used which will further complicate the discharging problem.

BRIEF SUMMARY

The object of this invention is to provide a method and device for layer-wise production of three-dimensional objects from a powdery material, which method and device allow for a controlled and proper fusing together of the powdery material, and which are well suited for the use of multiple electron beams. This object is achieved by the method and device defined in independent claims 1 and 11, respectively. The dependent claims contain advantageous embodiments, further developments and variants of the invention.

The invention concerns a method for producing three-dimensional objects layer by layer using a powdery material which can be solidified by irradiating it with at least two electron beams emanating from at least two electron beam sources, said method comprises a pre-heating step with the general purpose of pre-heating the powdery material in a homogeneous manner to elevate the powder material to a predetermined temperature interval $\Delta T$, which temperature interval $\Delta T$ is below the melting temperature of the powder material, followed by a solidifying step with the general purpose of fusing together the powdery material, wherein the pre-heating step comprises the sub-step of: scanning a pre-heating powder layer area (100) by scanning a first electron beam in a first region (I) along paths (I1.1-I5.20) and by scanning a second electron beam in a second region (II) along paths (II1.1-II5.20) distributed over the pre-heating powder layer area (100), wherein consecutively scanned paths (IM.N, I(M+1).N) and (IIM.N, II(M+1).N) are separated by, at least, a security distance ($\Delta Y$), said security distance ($\Delta Y$) being adapted to prevent a pre-heated powder in said first and second regions (I, II) respectively to reach a maximum charge density from said consecutively scanned paths, said sub-step further comprising the step of synchronising the preheating of said first and second electron beams when simultaneously preheating said powder material within said first and second regions (I, II) respectively, so that said first and second electron beams are always separated to each other with at least a minimum security distance ($\Delta X$).

An exemplary advantage of the inventive method is that the pre-heating step allows the powder layer to be homogenously heated up so as to avoid having too large temperature gradients in the interface between melted metal and powder in the subsequent solidifying step with multiple electron beams. By using a security distance adapted to prevent summation effects from consecutively scanned paths and a security distance between individual electron beams during the preheating step, it is possible to avoid that the energy deposited to the powder during scan of a first path adds to the energy deposited during scan of a second path scanned directly after the first path and/or that charge distribution from separate electron beams adds up to a level where powder particle start to repel each other.

When using multiple electron beams the pre-heating has a further advantageous effect in that it increases the efficiency in which a given area can be preheated.

The pre-heating of the powder has several advantageous compared to the rather obvious alternative to heat up an entire powder bed using e.g. heating elements. One advantage is that no further heating equipment is needed. Another advantage is that only the part of the powder bed that really needs to be heated, i.e. a fraction of the upper layer of the powder bed, may actually be heated. This makes the process very efficient.

In a first example embodiment of the inventive method the pre-heating step further comprises the sub-step of re-scanning the first and second regions of the pre-heating powder layer area. This way the first and second regions of the pre-heating area can be gradually and homogeneously heated up. In certain embodiments, the paths followed during a re-scan of the first and second regions of the pre-heating powder layer area are displaced an interspacing distance in relation to the paths followed during a previous scan of the pre-heating powder layer area, wherein the interspacing distance is less than the minimum security distance. This way it is possible to obtain a homogeneously pre-heated powder layer area also in situations where it is necessary to use a scanning pattern where the paths are physically separated by a distance that is shorter than the minimum security distance, i.e. in situations where additional, more closely positioned paths are needed.

In a second example embodiment of the inventive method the power of the first and/or second beams is increased during the pre-heating step. This has the advantage that the beam power initially can be kept at a sufficiently low level to avoid large charge densities and/or temperature gradients, but also that the beam power increases as the temperature of the powder increases as to speed up the pre-heating process as much as possible. In a particularly advantageous variant of the inventive method, the power of the first and second beam is increased stepwise between consecutive scans or re-scans of the pre-heating powder layer area. This makes it relatively easy to control the process and allows the powder pre-heating area to be heated in a uniform manner.

In a third example embodiment of the inventive method the beam power is increased by increasing the beam current of the first and/or second electron beams.

In certain embodiments the paths form substantially straight and parallel lines. Such paths simplifies the labour of finding a path pattern and path scanning order that works in practice, considering summation effects etc. Using straight and parallel paths also simplifies the control of the beam during scanning. To further simplify the process, the paths are in certain embodiments scanned from one end to the other.

In a fourth example embodiment of the inventive method the pre-heating powder layer area may be larger than, and thereby forms a security margin with respect to, a corresponding part of the powder layer that is to be fused together in the subsequent solidifying step. Such a security margin ensures that the whole product area, including its close surroundings, is properly pre-heated, i.e. such that the temperature and electrical conductivity of the powder layer do not change abruptly at the outer border of parts that are to be fused together. Without such a security margin it is likely that problems will arise due to a too large temperature gradient and/or a too large charge density.

The invention also concerns a device configured to be operated according to the inventive method, a program element, a computer readable medium and a non-transitory computer program product.

In one exemplary embodiment—although further embodiments are identified in the claims accompanying herewith—provided is a device (1) for producing three-dimensional objects (3) layer by layer using a powdery material (5) that can be solidified via irradiation thereof. The device comprises: at least one electron beam source emitting at least a first electron beam and a second electron beam; and a controller configured for: canning a pre-heating powder layer area (100) by scanning a first electron beam in a first region (I) along paths (I1.1-I5.20) and by scanning a second electron beam in a second region (II) along paths (II1.1-II5.20) distributed over the pre-heating powder layer area (100), wherein consecutively scanned paths (IM.N, I(M+1).N) and (IIM.N, II(M+1).N) are separated by, at least, a security distance ($\Delta Y$), said security distance ($\Delta Y$) being adapted to prevent a pre-heated powder in said first and second regions (I, II) respectively to reach a maximum charge density from said consecutively scanned paths; and synchronising preheating of said first and second electron beams when simultaneously preheating said powder material within said first and second regions (I, II) respectively, so that said first and second electron beams are always separated to each other with at least a minimum security distance ($\Delta$, $\Delta X$).

In another exemplary embodiment, in terms of a program element, there may be provided a program element configured and arranged when executed on a computer to implement a method for forming a three-dimensional article through successively depositing individual layers of powder material that are fused together so as to form the article in a vacuum chamber, said method comprising the steps of: scanning a pre-heating powder layer area (100) by scanning a first electron beam in a first region (I) along paths (I1.1-I5.20) and by scanning a second electron beam in a second region (II) along paths (II1.1-II5.20) distributed over the pre-heating powder layer area (100), wherein consecutively scanned paths (IM.N, I(M+1).N) and (IIM.N, II(M+1).N) are separated by, at least, a security distance ($\Delta Y$), said security distance ($\Delta Y$) being adapted to prevent a pre-heated powder in said first and second regions (I, II) respectively to reach a maximum charge density from said consecutively scanned paths, and synchronising the preheating of said first and second electron beams when simultaneously preheating said powder material within said first and second regions (I, II) respectively, so that said first and second electron beams are always separated to each other with at least a minimum security distance ($\Delta$, $\Delta X$). In certain embodiments, a computer readable medium may also be provided, having stored thereon the program element described above.

BRIEF DESCRIPTION OF THE SEVERAL VIEWS OF THE DRAWING(S)

In the description of the invention given below reference is made to the following figure, in which.

Figure 2:
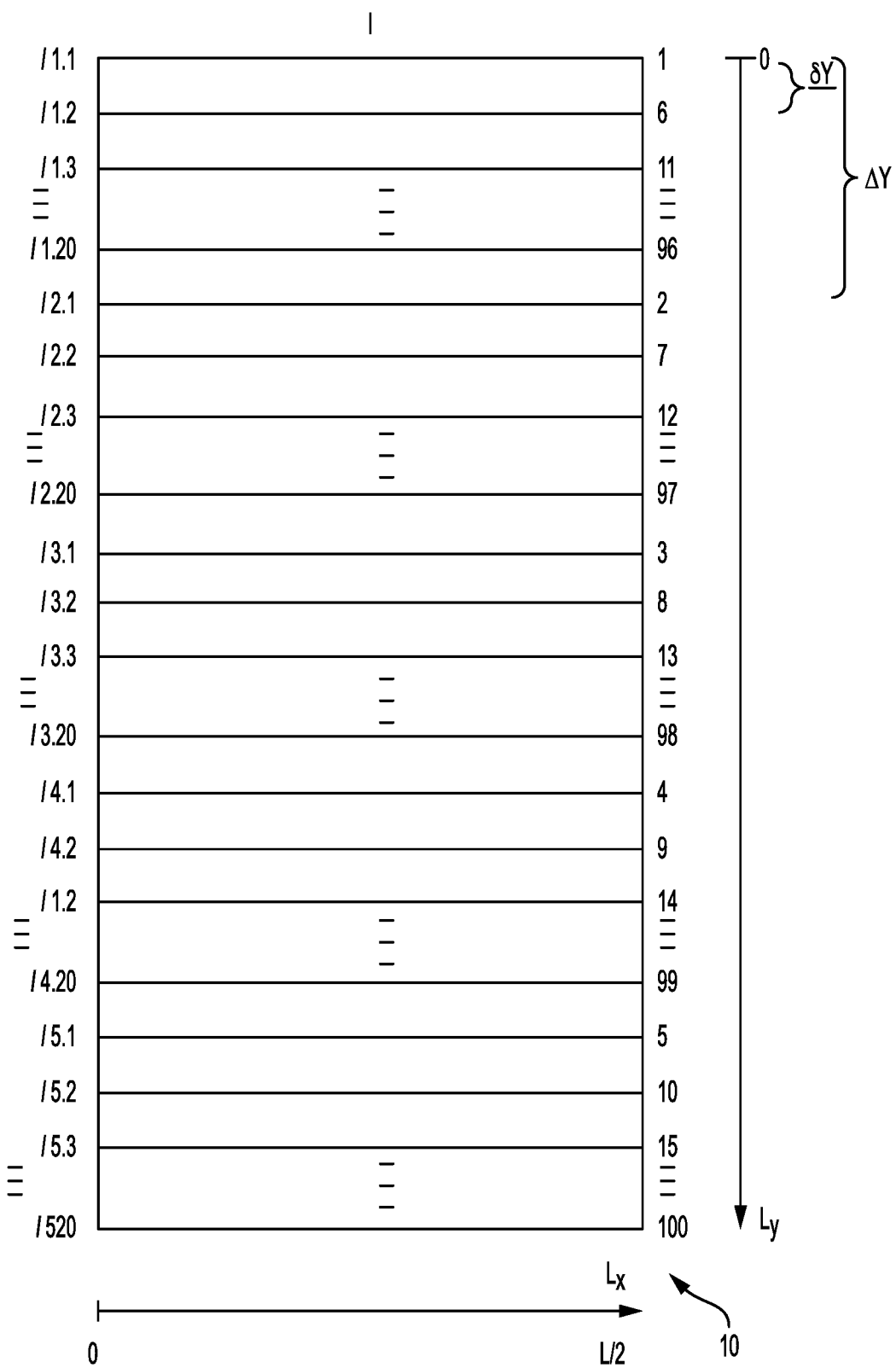
Figure 3:
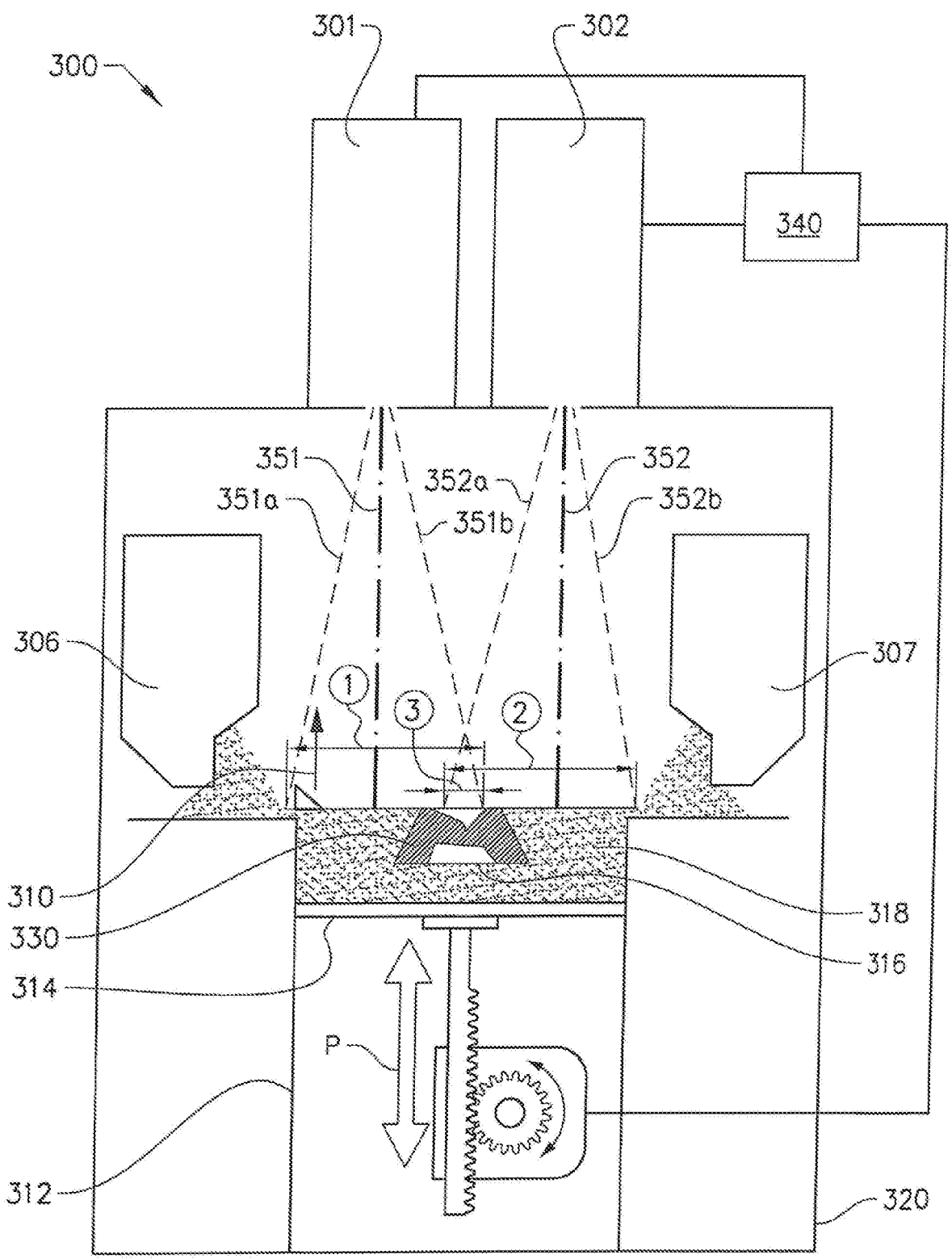
Figure 4:
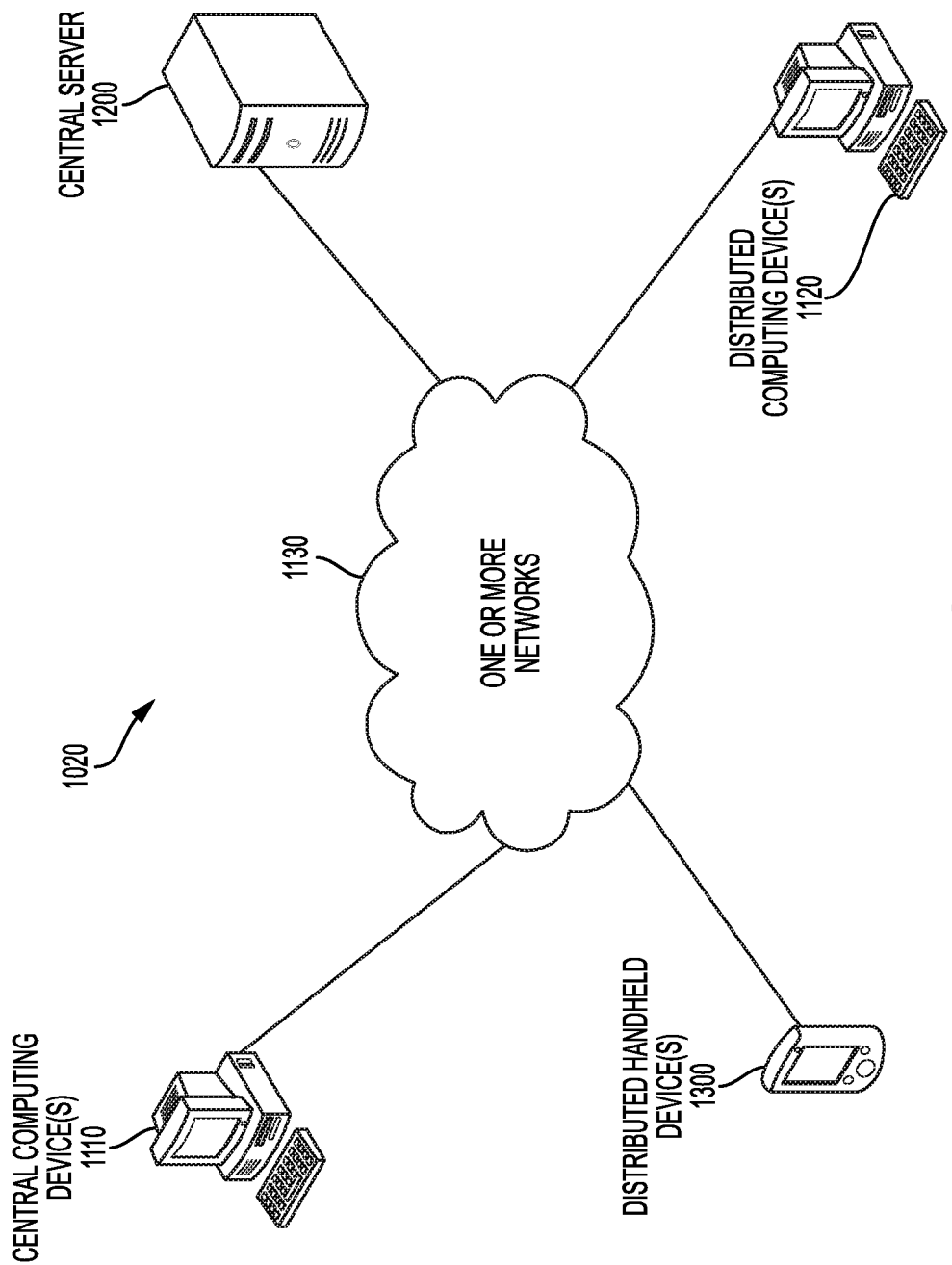
Figure 5A:
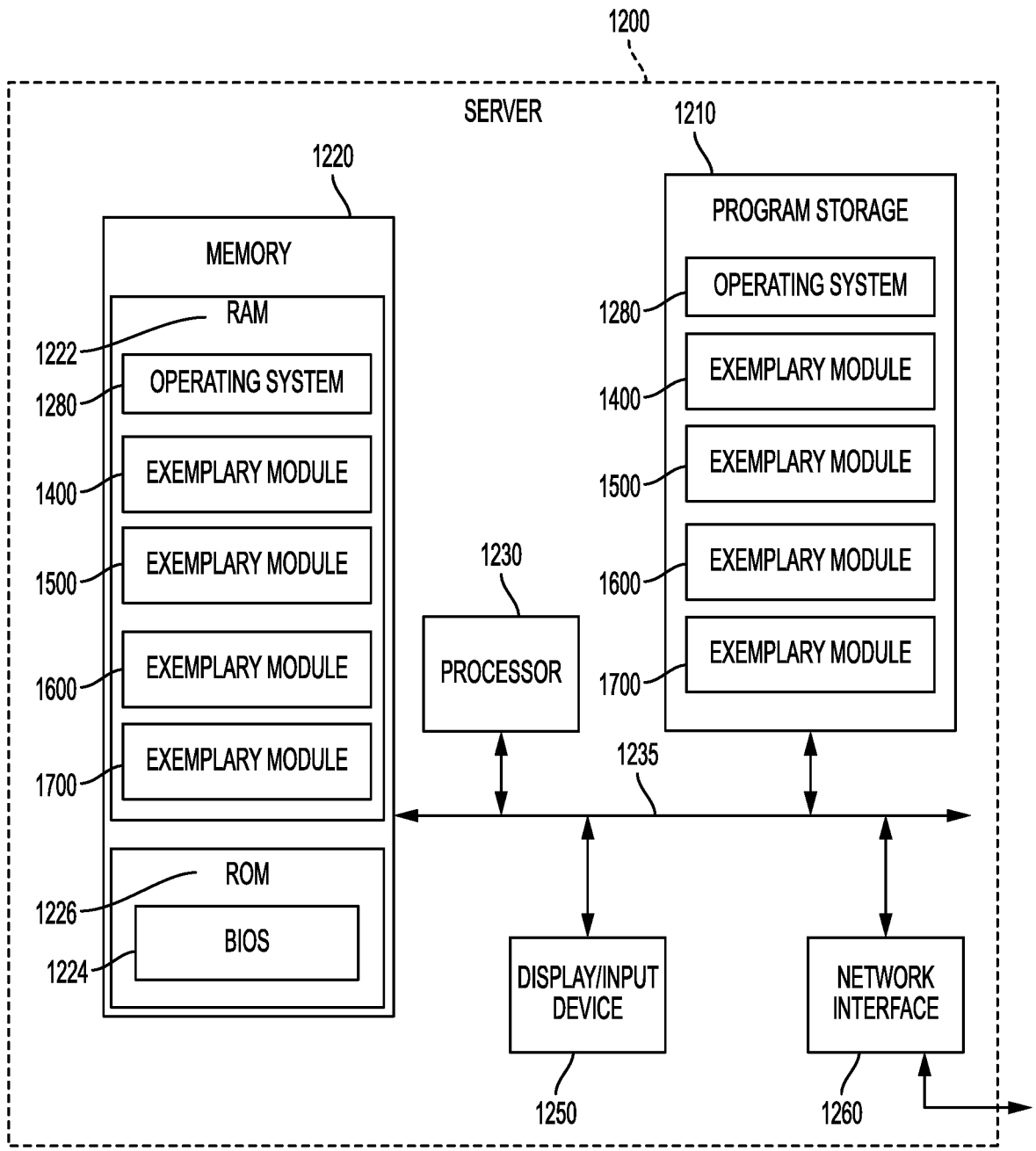
Figure 5B:
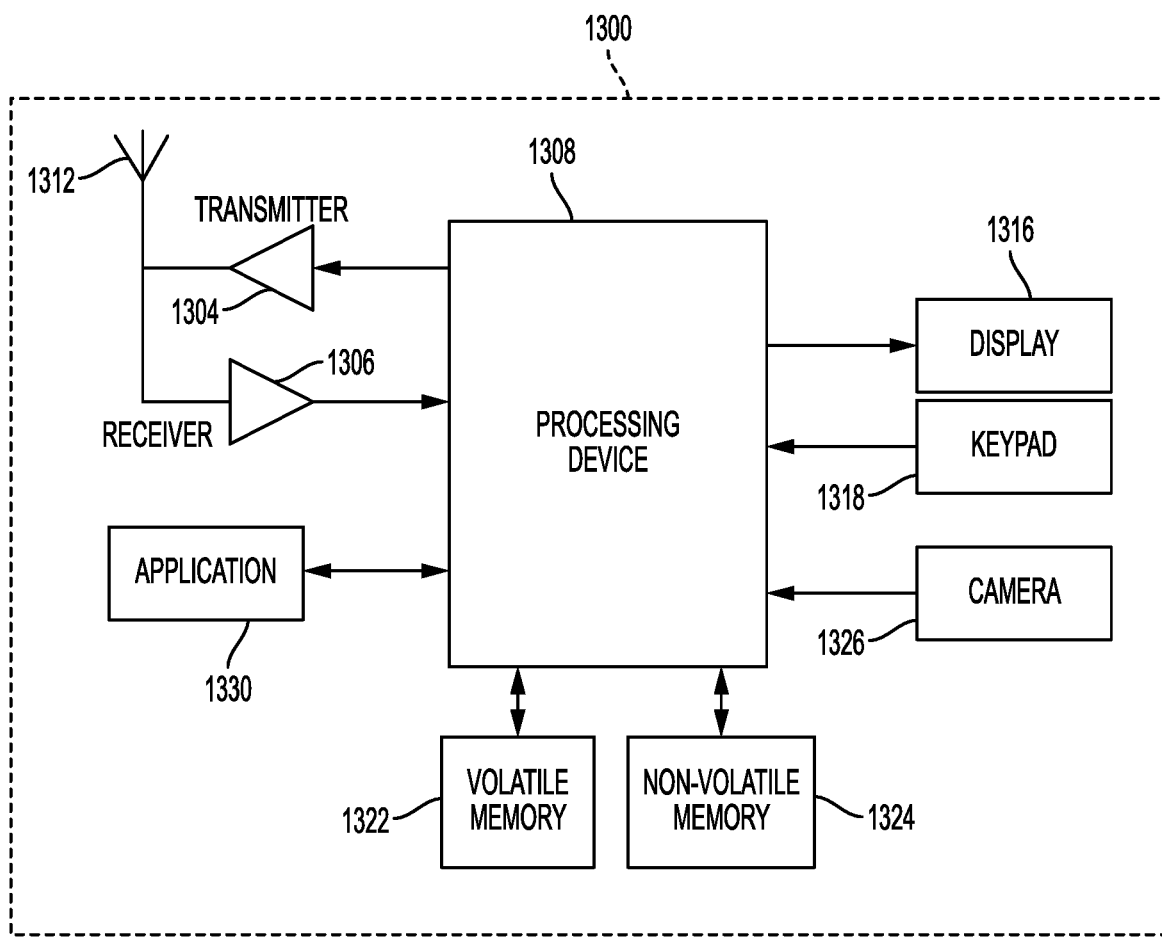

FIG. 2 shows an example embodiment of how scan lines from a first electron beam in a first region may be arranged, and FIG. 3 shows, in a schematic view, an example of a known device for producing a three-dimensional product to which device the inventive method can be applied, and FIG. 4 is a block diagram of an exemplary system 1020 according to various embodiments, and FIG. 5A is a schematic block diagram of a server 1200 according to various embodiments, and FIG. 5B is a schematic block diagram of an exemplary mobile device 1300 according to various embodiments.

BRIEF DESCRIPTION OF THE SEVERAL VIEWS OF THE DRAWING(S)

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron gun, a linear accelerator and so on.

FIG. 3 depicts an example embodiment of a freeform fabrication or additive manufacturing apparatus 300 according to prior art. Said apparatus 300 comprises two electron guns 301, 302; two powder hoppers 306, 307; a start plate 316; a build tank 312; a powder distributor 310; a build platform 314; a vacuum chamber 320 and a control unit 340. FIG. 3 discloses only two beam sources for sake of simplicity. Of course, any number of beam sources can be used in a similar manner as the two beam sources which are used for describing the invention. It is obvious for the skilled person when having seen the inventive concept as disclosed hereinbelow using only two beam sources and apply them for any specific number that might suit his or her purpose.

The vacuum chamber 320 is capable of maintaining a vacuum environment by means of or via a vacuum system, which system may comprise a turbomolecular pump, a scroll pump, an ion pump and one or more valves which are well known to a skilled person in the art and therefore need no further explanation in this context. The vacuum system is controlled by the control unit 340. In an alternative embodiment the build tank may be provided in an enclosable chamber provided with ambient air and atmosphere pressure. In still another example embodiment said build chamber may be provided in open air.

The electron guns 301, 302 are generating electron beams, which are used for melting or fusing together powder material 318 provided on the start plate 316. The control unit 340 may be used for controlling and managing the electron beams emitted from the electron beam guns 301, 302. A first electron beam source 301 may be emitting a first electron beam 351 and a second electron beam source 302 may be emitting a second electron beam 352. The first electron beam 351 may be deflected between at least a first extreme position 351a and at least a second extreme position 351b defining a first selected area 1 or a first region I. The second electron beam 352 may be deflected between at least a first extreme position 352a and at least a second extreme position 352b defining a second selected area 2 or a second region II. At least one of said first or second extreme positions 351a, 351b of said first electron beam 351 may be overlapping one of said at least first or second extreme positions 352a, 352b of said second electron beam 352 and thereby creating an overlap region 3.

At least one focusing coil (not shown), at least one deflection coil and an electron beam power supply may be electrically connected to said control unit. In an example embodiment of the invention said first end second electron beam source may generate a focusable electron beam with an accelerating voltage of about 60 kV and with a beam power in the range of 0-3 kW. The pressure in the vacuum chamber may be in the range of $1\times10^{-3}$-$1\times10^{-6}$ mBar when building the three-dimensional article by fusing the powder layer by layer with the energy beam sources 301, 302.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, etc. Instead of two powder hoppers, one powder hopper may be used. Other designs and/or mechanism for of the powder supply may be used, for instance a powder tank with a height-adjustable floor.

The powder distributor 310 is arranged to lay down a thin layer of the powder material on the start plate 316. During a work cycle the build platform 314 will be lowered successively in relation to the ray gun after each added layer of powder material. In order to make this movement possible, the build platform 314 is in one embodiment of the invention arranged movably in vertical direction, i.e., in the direction indicated by arrow P. This means that the build platform 314 starts in an initial position, in which a first powder material layer of necessary thickness has been laid down on said start plate 316. A first layer of powder material may be thicker than the other applied layers. The reason for starting with a first layer which is thicker than the other layers is that one does not want a melt-through of the first layer onto the start plate. The build platform is thereafter lowered in connection with laying down a new powder material layer for the formation of a new cross section of a three-dimensional article. Means for lowering the build platform 314 may for instance be through a servo engine equipped with a gear, adjusting screws etc.

The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with arbitrary values of the beam current and beam scanning velocity.

Figure 1A:
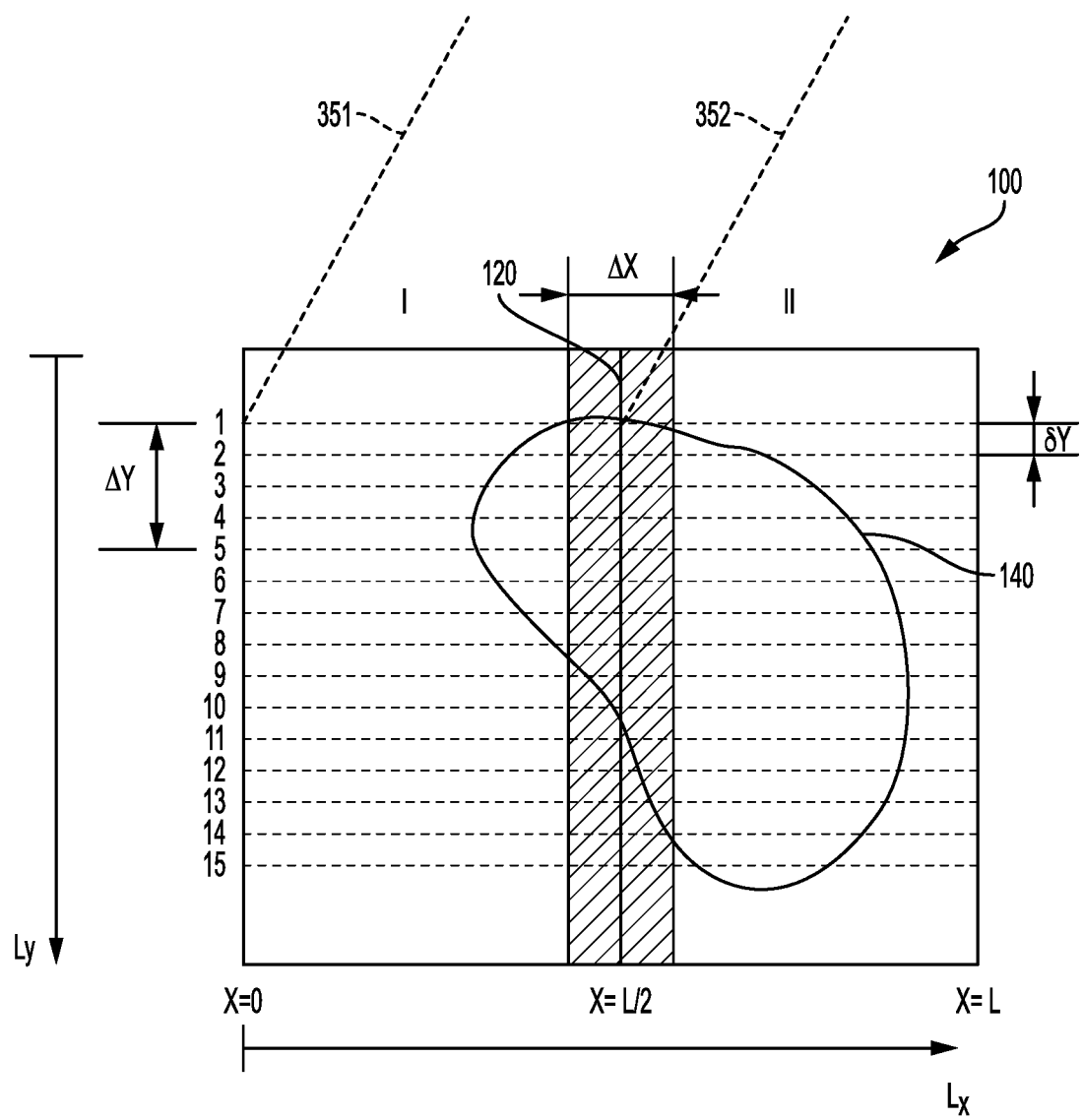
FIG. 1A shows an example of a first embodiment of the inventive method.

FIG. 1A shows an example of a first embodiment of the inventive method. A preheating area 100 comprises a first region I and a second region II. The first region I is scanned with a first electron beam 351 from a first electron beam source 301 (not shown) and said second region II is scanned with a second electron beam 352 from a second electron beam source 302 (not shown). A cross section of the three dimensional articles to be manufactured is denoted by 140. Said three-dimensional article 140 is arranged in both of said first and second regions I and II respectively. In the illustrated example the first and second electron beams 351, 352 are scanned in straight scan lines. The first electron beam 351 may scan from the left to the right, i.e. from x=0 to x=L/2. The second electron beam 352 may scan from the left to the right, i.e. from x=L/2 to x=L.

If the second electron beam 352 is switched off while the first electron beam 351 is preheating, said first and second electron beams 351, 352 will never interfere with each other. However, sequential preheating is not as time efficient as simultaneous preheating where the first and second electron beams 351, 352 are switched on simultaneously and preheating its first and second regions I, II respectively simultaneously.

In order to prohibit interference of said first and second electron beams which may result in to high charge distribution, a synchronisation of the preheating of said first and second electron beams may be necessary when simultaneously preheating said powder material within said first and second regions respectively. The synchronisation may be performed so that said first and second electron beams 351 and 352 are always separated to each other with at least a minimum security distance ($\Delta X$). In FIG. 1A said minimum security distance ($\Delta X$) has been illustrated as a corridor which is overlapping a border 120 between said first region I and said second region II. If the two electron beams 351 and 352 respectively are separated by at least said minimum security distance the sum of the charge distribution in said powder material will not reach to a critical point in which said powder particles may start to repel each other. If said first and second electron beams are not simultaneously inside said corridor, i.e., only one of said first and second electron beams 351, 352 respectively are allowed to be inside said corridor, the charge distribution is under control.

In an alternative embodiment said first and second electron beams 351, 352 may be allowed to be inside said corridor simultaneously provided that said first and second beams are always separated with a greater distance than said minimum security distance ($\Delta X$). This can be the case if for instance said first electron beam 351 is scanning line 1 and said second electron beam 352 is simultaneously scanning line 5 or further away, in such case the distance between said first and second electron beams are greater than said minimum security distance ($\Delta X$) although they are simultaneously within said corridor.

As mentioned above the first electron beam 351 may scan from the left to the right, i.e. from x=0 to x=L/2. The second electron beam 352 may scan from the left to the right, i.e. from x=L/2 to x=L. The first electron beam 351 may start its scan of line 1 in the first region I before the second electron beam 352 starts its scan of line 1 in the second region II, i.e., the second electron beam 352 may start its scan along line 1 in the second region II when the first electron beam 351 is somewhere in between X=0 and X=L/2 but not in said corridor denoted by ($\Delta X$).

In an alternative embodiment the second electron beam 352 may start its scan of line 1 in the second region II before the first electron beam 351 starts its scan of line 1 in the first region I, i.e., the first electron beam 351 may start its scan along line 1 in the first region I when the second electron beam 352 is somewhere in between X=L/2 and X=L.

In still another example embodiment the first electron beam 351 scans from left to the right while the second electron beam 352 scan from the right to the left. In such case one has to control and synchronize the position of the electron beams so to make sure they are always further away from each other than said minimum security distance ($\Delta X$).

In yet another example embodiment said first region I and/or said second region II may alternate between scanning from the left to the right and from the right to the left making sure that the first and second electron beams are always separated at least by said minimum security distance ($\Delta X$).

In still another example embodiment said first region I may scan lines from top to bottom (from low to high scan line No.) whereas in said second region II said lines may be scanned from the bottom to the top (from high to low scan line No.).

In still another example embodiment said first electron beam may start scanning said first line denoted by 1 simultaneously as said second electron beam may start scanning said fifth line denoted by 5.

In FIG. 1A it is illustrated 15 scan lines starting with No. 1 at the top of the preheating area 100. All scan lines 1-15 are illustrated with dashed line sections and solid line sections. The dashed line sections denotes preheating only and the sold lines denotes preheating followed by fusion for forming the three dimensional article 140. In FIG. 1A, a large area outside the three-dimensional article 140 is preheated. In an alternative embodiment a smaller area surrounding the three-dimensional article 140 is preheated leaving the area outside said preheated area non-affected by the first and second electron beams 351, 352 for that particular cross section of the three dimensional article 140. By reducing the preheating area to a smaller area than the full building area the manufacturing speed may be increased. The smaller area surrounding the three-dimensional article 140 may have a different shape than the actual cross section of the three-dimensional article 140 or the same but an enlarged shape as the three-dimensional article 140.

Figure 1B:
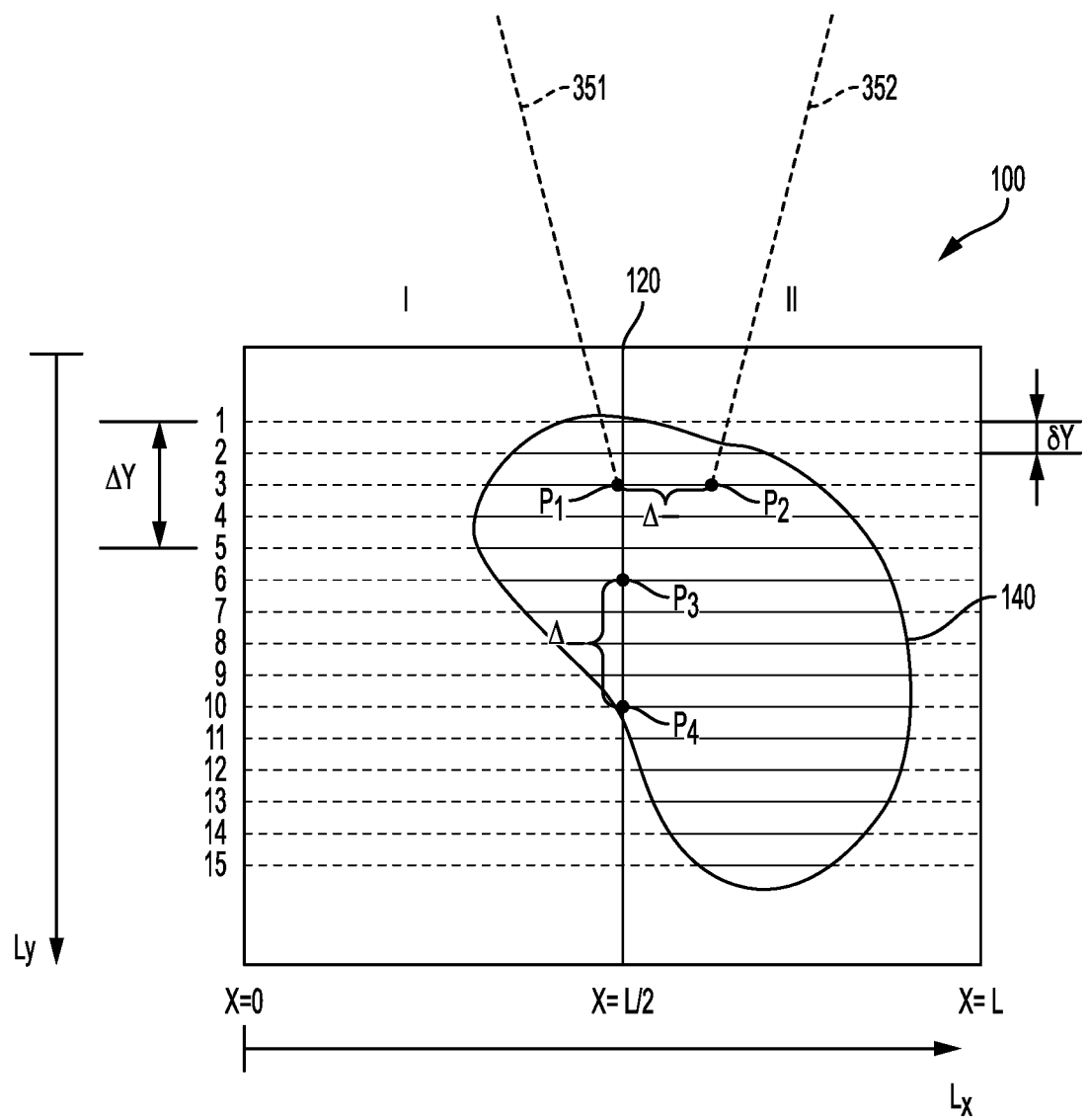
FIG. 1B shows a second and a third embodiment of the inventive method.

FIG. 1B shows two further example embodiments of the inventive method. In FIG. 1B the first electron beam 351 may positioned in the first region I at point P1 and the second electron beam may be position in the second region II at point P2. The distance between P1 and P2 is denoted by A, which is the minimum security distance. In FIG. 1B the first and second electron beams P1, P2 may be positioned on the same line, exemplified as line with number 3. The synchronisation of the first and second electron beams makes sure that the distance between said first and second electron beams P1, P2 are always at least said minimum security distance $\Delta$ irrespective of where said first and second electron beams are positioned. However, in another example embodiment said first electron beam may be positioned at a point denoted by P3 and a second electron beam may be positioned a position denoted by P4. Both P3 and P4 are arranged on the border between said first and second regions I, II respectively.

FIG. 2 depicts an example embodiment of how scan lines from a first electron beam 351 in a first region I may be arranged, wherein the conductivity is increased without creating discharges. Here, the first electron beam 351 is scanned along paths distributed in a certain pattern over a part of the powder bed that is to be solidified, for the purpose of pre-heating the powder. The part of the upper layer of the powder bed subjected to pre-heating is denoted the pre-heating powder layer area 10, or only pre-heating area 10. Reference numbers L/2 and $L_y$ denotes the sides of the, in this example rectangular, pre-heating area 10 of said first region I. The first electron beam 351 follows the paths, indicated by straight and parallel lines I1.1, I1.2 etc, from the left to the right, i.e. from x=0 to x=$L_{/2}$. On the left side of the lines/paths, a code of each path is given. On the right side of the lines/paths, the order in which the paths are scanned is given. Thus, the first path to be scanned is I1.1, the next path is I2.1, after that path I3.1 and so on. Such consecutively scanned paths are physically separated by a security distance $\Delta Y$ that will be further discussed below.

The minimum security distance ΔX, Δ may be larger than the security distance ΔY. The reason for that is that there is a time delay between consecutively paths in which the charge distribution may have diminished somewhat whereas in the case of two simultaneous electron beams approaching each other there is no time delay but just a summation of the charge distribution around each of the electron beams in said powder material.

Depending on the particular conditions, such as dimensions of pre-heating area 10, beam power and beam scanning velocity, it may be necessary to use a scanning pattern where the paths are physically separated by a distance that is shorter than the security distance ΔY in order to obtain a homogeneously pre-heated powder layer area 10. FIG. 2 shows an example of such a case where additional, more closely positioned paths are needed. The additional paths are indicated with codes I1.2, I1.3 etc. Adjacent paths, such as I1.20 and I2.1 or I3.2 and I3.3, are physically separated by an interspacing distance δY. As can be seen on the right side of the lines/paths in FIG. 2, adjacent paths are not scanned in a consecutive order in order to still separate consecutively scanned paths by the security distance ΔY.

In the example shown in FIG. 2, the pre-heating area 10 can be seen as divided into five sub-areas, I1 to I5, and in each sub-area the number of paths to be scanned are 20; e.g. I1.1 to I1.20 in the first sub-area I1. More generally, the paths can be denoted IM.N, wherein M is the number of the sub-area and N is the number of a particular path in the sub-area M. In FIG. 2, M goes from 1 to 5 and N goes from 1 to 20, which leads to a total number of 100 paths to be scanned. The values of M and N may be varied depending on e.g. the size of the pre-heating area 10 and on the desired pre-heating temperature and/or desired degree of pre-sintering of the powder. In FIG. 2 the pre-heating area 10 is equal to the first region I.

As given by the path scanning order in FIG. 2, the pre-heating area 10 is scanned several times in the y-direction, in this example 20 times. The first time the pre-heating area 10 is scanned, the scanning procedure is such that the first path IM.1 in each sub-area I1 to I5 is scanned. When this initial step is finished, the pre-heating area 10 is re-scanned by scanning the second path IM.2 in each sub-area I1 to I5. In the next re-scan, the third path IM.3 in each sub-area I1 to I5 is scanned, and so on. This procedure may be seen as one single scanning pattern, comprising the N:th path of each sub-area I1-I5, which single scanning pattern is displaced in the y-direction, i.e. downwards in FIG. 2, a distance corresponding to the interspacing distance δY once the scan of all paths in the single scanning pattern has been completed. In other words, the paths of a re-scan are displaced in parallel a distance δY relative to the paths of the previous scan. The reference N denotes the order of the scan or re-scan of the pre-heating area 10, wherein N starts with 1 (for the first scan) and goes to a maximum value that, in this example, is 20 (for the last scan). Below, this maximum value of N is denoted $N_r$.

Each scanning or re-scanning of the pre-heating area 10 has the effect of increasing the temperature of the powder bed that in turn has the effect of increasing the electrical conductivity of the powder. The beam current can therefore be increased after each (re-) scanning procedure. How much the beam current can be increased between the scans depends on how much the conductivity can be increased in the preceding scan.

It is important that the beam current, the beam scanning velocity and the paths to be scanned are adapted such that the charge density around the position where the beam hits the powder is prevented from exceeding a critical limit above which discharge will occur.

A general function for describing the charge density that develops in the powder in an arbitrary scanning procedure will be a rather complex function of time and beam position since the charge density generated along one scanned path will be affected by the charge density generated along another scanned path if these paths are not very well separated in space and time. Thus, summation effects between different paths must be taken into account.

In a predetermined scanning procedure using straight and parallel scanning paths, similar to those shown in FIGS. 2 and 3, summation effects are much easier to control. For a single, straight path the charge density depends the fraction $I/V_s$, where I is the beam current and $V_s$ is the beam scanning velocity relative to the powder bed. If this fraction is too high, too much charge will be deposited to the powder per path length unit. From a production point of view it is desirable to increase the temperature in an efficient manner to minimize the time required for pre-heating the powder. Thus, the beam current and the beam velocity should be as high as possible without exceeding the critical limit in charge density. However, since charges will remain around a scanned path for some time the summation of charge density between different scans has to be considered. It is important that the beam does not return to the same position, or to the close vicinity of the same position, until a certain minimum time period $t_0$ has elapsed.

Thus, for a given path length in a pre-heating area 10 the beam scanning velocity is not solely determined by the fraction $I/V_s$ but also by the time period $t_0$ that has to elapse before the beam can return to the same position. As the charge density decreases not only with time but also with distance from the previously scanned position, the required time period that must be allowed to elapse before a certain position of the powder layer can be scanned decreases with increasing distance from the previously scanned position. In a first order approximation this distance-dependent security time period, $t_p$, can be considered to be independent of beam current and set to:

$$t_p = t_0 - k_r * r,$$

where $t_0$ is the time that has to elapse before the beam can return to the same position as it was at t=0, r is the distance between the beam position at t=0 and the new position at time t, and $k_r$ is a proportional factor. Here, $t_p$ is assumed to have values between 0 and $t_0$, which means that summation effects are considered to be negligible for sufficient large values of r.

Consequently, the scanning of the paths of the pre-heating area 10 must be arranged such that the paths become sufficiently separated in time and/or space so as to avoid undesirable charge summation effects in the pre-heating powder layer area 10. This holds both for charge summation effects as discussed above and for energy summation effects wherein the amounts of energy deposited along two paths add together so as to locally raise the temperature too much. Consecutively scanned paths, such as I4.2 and I5.2 in FIG. 2, must be physically separated to a higher extent than other scanned paths since the time period elapsed between consecutively scanned paths is shorter (provided that the paths are of equal length and an equal time period between start of the scan of each individual path).

From a given beam scanning velocity, $V_s$, and a given length of the paths, $L_x$, it is possible to convert the required distance-dependent security time period $t_p$ to a security distance ΔY, which is easier to handle in practice than a minimum time period. The required length of this distance $\Delta Y$ depends on how fast the beam returns to x=0. Thus, $\Delta Y$ increases with decreasing length of the paths $L_x$ and with increasing beam scanning velocity $V_s$. In FIG. 2, consecutively scanned path, such as I4.2 and I5.2, are separated by the security distance $\Delta Y$.

As described above, a certain time period must be allowed to elapse before different paths can be scanned. In order to reduce the total time required for pre-heating the powder, it is important that the beam scans parts of the pre-heating area 10 that are not subject to a "period of rest" set by $t_p$.

In the example below the following parameters are used:

$L_x$, $L_y$=lengths of the sides of the pre-heating powder layer area 10, $V_s$=beam scanning velocity, $I_0$=initial beam current, $\Delta I$=beam current increase between re-scanning of the pre-heating area 10, $N_r$=number of times the pre-heating area 10 is scanned, $\Delta Y$=distance between two consecutively scanned paths; security distance, and $\delta Y$=distance between two adjacent path; interspacing distance.

For a given powder layer area, i.e. where values of $L_x$, $L_y$ are given, it is possible to empirically obtain the values for $V_s$, $I_0$, $\Delta I$, $N_r$, $\Delta Y$ and $\delta Y$ that are required for a proper pre-heating of the powder area in question.

Table 1 shows an example of proper values of $V_s$, $I_0$, $\Delta I$, $N_r$, $\Delta Y$ and $\delta Y$ for a certain powder layer area ($L_x$, $L_y$), a certain accelerating voltage (60 kV), and a certain, commercially available, powder (gas atomized ELI Ti6Al4V).

TABLE 1

| | |
|---|---|
| $L_x$ | 120 mm |
| $L_y$ | 120 mm |
| $V_s$ | 10000 mm/s |
| $I_0$ | 1 mA |
| $\Delta I$ | 1 mA |
| $N_r$ | 18 |
| $\Delta Y$ | 24 mm |
| $\delta Y$ | 1.2 mm |

Assuming that the time required for the beam to "jump" between different paths is negligible (which normally is a fair assumption since the "jump" velocity of a beam normally is much greater than its scanning velocity) and assuming that linear relationships are valid, it is possible to use the parameter values in Table 1 for producing relationships that can be used for arbitrary values of $L_x$ and $L_y$. To obtain the most accurate empirical values, these values should be produced using a powder area that is as small as possible, i.e. the values of $L_x$ and $L_y$ should be as small as possible. However, approximate empirical values, that might be sufficiently accurate, can be obtained in a faster way by starting out with a larger powder area (larger $L_x$ and $L_y$). In certain embodiments, the same value of $\delta Y$ is used independently of the values of $L_x$ and $L_y$ because $\delta Y$ also affects the surface finish of the completed three-dimensional product. It is also important that the total energy deposited per area unit is evenly distributed in order to keep the temperature as even as possible over the powder area in question irrespective of the values of $L_x$ and $L_y$.

With reference to Table 1, the following relationships and limiting parameters are valid:

$$t_0 = (L_y/\Delta Y) \cdot L_x/V_s,$$

$$k_r = (t_0 - L_x/V_s)/\Delta Y,$$

$$k_1 = I_0/V_s,$$

$$k_2 = \Delta I/V_s,$$

and $$k_3 = (I_0 + N_r \cdot \Delta I) \cdot N_r/(V_s \cdot \delta Y \cdot 2),$$

where $t_0$ is the minimum time period that must be allowed to pass before the beam returns to (the close vicinity of) a previously scanned path (i.e. $t_0$ is the time period that has to elapse before the beam can return from e.g. line PM.N to PM.N+1); $k_r$ is the factor used to determine the time period that must be allowed to pass before the beam returns to x=0 at a distance $\Delta Y$ from a previously scanned path; $k_1$ is proportional to the maximum amount of charge deposited per mm of the paths during the first scan of the pre-heating area 10; $k_2$ is proportional to the maximum charge deposition increase per mm for each re-scan of the pre-heating area 10; and $k_3$ is proportional to an average energy deposition per mm² required for keeping the powder surface at a certain temperature.

Here, $t_0$ and $k_r$ are minimum values, whereas $k_1$ and $k_2$ are maximum values that should not be exceeded. The factor $k_3$ is a form of guideline value but can be seen as a maximum value that should not be exceeded for the purpose of speeding up the process.

Values of these limiting parameters can be obtained by using the empirically obtained values in Table 1. After having obtained these limiting parameters, they can be used to calculate the five unknown parameters $V_s$, $I_0$, $\Delta I$, $N_r$ and $\Delta Y$ for arbitrary values of $L_x$ and $L_y$, as long as $\delta Y$ is kept at almost the same value. Some care has to be taken since the fractions $L_y/\Delta Y$ and $\Delta Y/\delta Y$ have to be integers. Thus, the parameters may be determined in an iterative way where, for instance, $L_x$ is kept fixed whereas $L_y$ and $\delta Y$ are allowed to vary somewhat.

The task of obtaining empirical values, such as those given in Table 1, for other types of powders on the basis of the information given in this text, can be considered to be routine work for a man skilled in the art. A general rule is that $t_0$, and thus $t_p$, increase with decreasing conductivity of the powder. Thus, for a powder with a low conductivity, large values for $L_x$, $L_y$, $V_s$, $N_a$ and $\Delta Y$ might be necessary; in conjunction with low values for $I_o$ and $\Delta I$.

As described above, pre-heating of the powder layer may be performed over a rectangular powder layer area that encloses all parts of the powder that are to be fused together. This may, however, be an inefficient approach since, depending on the form of the product to be produced; an unnecessarily large powder area might be heated up.

In another aspect of the invention it is provided a program element configured and arranged when executed on a computer to implement a method for forming a three-dimensional article through successively depositing individual layers of powder material that are fused together so as to form the article. The program may be installed in a computer readable storage medium. The computer readable storage medium may be the control unit 8 described elsewhere herein or another separate and distinct control unit, or another comparable device, as desirable and well-known. The computer readable storage medium and the program element, which may comprise computer-readable program code portions embodied therein, may further be contained within a non-transitory computer program product. Further details in this regard are provided elsewhere herein.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 4 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 4 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™ infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 4 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

FIG. 5A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor.

The server 1200 further includes memory 1220, which in certain embodiments includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

FIG. 5B provides an illustrative schematic representative of a mobile device 1300 that can be used in conjunction with various embodiments of the present invention. Mobile devices 1300 can be operated by various parties. As shown in FIG. 5B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited by the embodiments described above but can be modified in various ways within the scope of the claims. For instance, if the ratio $L_x/V_s$ is large, it is possible to position the subsequent path close to the path just scanned. In such a case the security distance $\Delta Y$ may be set equal to the interspacing distance $\delta Y$, i.e. the same paths are scanned in each re-scan.

It is further possible to scan the paths in a different order than what is described in relation to FIG. 2. For instance, the first path in each sub-group (I1.1, I2.1, etc.) could be scanned several times before the second path in each sub-group (I1.2, I2.2, etc.) is scanned. On some occasions, in particular if the fraction $L_x/V_s$ is large, it may also be possible to scan the same path several times without scanning any other paths in between.

Moreover, the paths do not necessarily have to be straight and parallel lines. However, such a path pattern simplifies the labour of finding a path pattern and path scanning order that works in practice, considering summation effects etc. Using straight and parallel paths also simplifies the control of the beam during scanning.

The invention claimed is:

1. A method for producing three-dimensional objects layer by layer using a powdery material which is solidified by irradiating the powdery material with at least two electron beams emanating from at least two electron beam sources, said method comprises the steps of:
    pre-heating a powder layer area in a homogeneous manner to elevate the powder layer area to a predetermined temperature, which temperature is below the melting temperature of the powdery material, and
    fusing together the powdery material,
    wherein the pre-heating step comprises sub-steps of:
        scanning the powder layer area by scanning a first electron beam in a first region along a first series of paths and by scanning a second electron beam in a second region along a second series of paths distributed over the powder layer area, wherein consecutively scanned paths in each of the first and second series of paths are separated by, at least, a security distance, said security distance being adapted to prevent a pre-heated powder in said first and second regions respectively to exceed a maximum charge density, above which discharge will occur, from said consecutively scanned paths, and
        synchronizing a movement of said first and second electron beams when simultaneously preheating said powdery material within said first and second regions respectively, so that said first and second electron beams are always separated from each other by at least a minimum security distance, said minimum security distance being adapted to prevent a sum of a charge distribution in the powdery material from reaching a critical point at which powder particles start to repel each other.

2. The method according to claim 1, wherein the pre-heating step further comprises a sub-step of re-scanning the first and second regions of the powder layer area.

3. The method according to claim 2, wherein the paths followed during a re-scan of the powder layer area are displaced an interspacing distance in relation to the paths followed during a previous scan of the powder layer area, wherein the interspacing distance is less than the security distance.

4. The method according to claim 1, wherein the power of at least one of said first or second beam is increased during the pre-heating step.

5. The method according to claim 4, wherein the power of at least one of said first or second beam is increased by increasing beam current.

6. The method according to claim 2, wherein the power of at least one of the first or the second beam is stepwise increased between consecutive scans or re-scans of the powder layer area.

7. The method according to claim 6, wherein the power of at least one of said first or second beam is increased by increasing beam current.

8. The method according to claim 1, wherein the first series of paths are scanned from a first end to a second end and the second series of paths are scanned from the second end to a third end.

9. The method according to claim 1, wherein the first series of paths and the second series of paths are parallel.

10. The method according to claim 1, wherein the first series of paths and the second series of paths form straight lines.

11. The method according to claim 1, wherein the powder layer area is larger than, and thereby forms a security margin with respect to, a corresponding part of the powder layer that is to be fused together in the fusing step.

12. The method according to claim 1, wherein at least one of the steps is computer-implemented via utilization of at least one control unit.

* * * * *